(12) United States Patent
He et al.

(10) Patent No.: US 11,714,315 B2
(45) Date of Patent: Aug. 1, 2023

(54) BACKLIGHT ASSEMBLY AND FORMATION METHOD THEREOF, AND DISPLAY APPARATUS

(71) Applicant: Lenovo (Beijing) Limited, Beijing (CN)

(72) Inventors: Xiufeng He, Beijing (CN); Zhenyuan Zhao, Beijing (CN); Yi-Teng Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/693,118

(22) Filed: Mar. 11, 2022

(65) Prior Publication Data
US 2023/0094044 A1 Mar. 30, 2023

(30) Foreign Application Priority Data
Sep. 29, 2021 (CN) .......................... 202111148598.5

(51) Int. Cl.
*G02F 1/13357* (2006.01)
*G02F 1/1335* (2006.01)

(52) U.S. Cl.
CPC .. *G02F 1/133603* (2013.01); *G02F 1/133605* (2013.01); *G02F 1/133607* (2021.01); *G02F 1/133611* (2013.01); *G02F 1/133614* (2021.01)

(58) Field of Classification Search
CPC ......... G02F 1/133603; G02F 1/133606; G02F 1/133605; G02F 1/133607; G02F 1/133614; G02B 6/0011; G02B 6/0041; G02B 6/0065; F21V 5/007; F21V 7/0091; H01L 25/0753; H01L 33/52; H01L 33/54; H01L 33/56; H01L 33/60
See application file for complete search history.

(56) References Cited

U.S. PATENT DOCUMENTS

| | | | | |
|---|---|---|---|---|
| 2006/0221611 | A1 | 10/2006 | Noh et al. | |
| 2013/0021799 | A1* | 1/2013 | Veerasamy | F21V 9/32 156/280 |
| 2020/0166767 | A1* | 5/2020 | Qin | G02B 6/005 |
| 2020/0300444 | A1* | 9/2020 | Lee | F21V 3/12 |

(Continued)

FOREIGN PATENT DOCUMENTS

| | | |
|---|---|---|
| CN | 201448680 U | 5/2010 |
| CN | 107505769 A | 12/2017 |
| CN | 108169958 A | 6/2018 |

(Continued)

*Primary Examiner* — Erin Kryukova
(74) *Attorney, Agent, or Firm* — Anova Law Group, PLLC

(57) ABSTRACT

A backlight assembly and its formation method, and a display apparatus are provided in the present disclosure. The formation method includes a circuit board; a plurality of light-emitting elements, disposed at a side of the circuit board; and a light guide element, configured to transmit light emitted from the plurality of light-emitting elements to a display element according to a preset light-guiding path. The backlight assembly transmits the light emitted from the light-emitting elements to the display element according to the preset light-guiding path through the light guide element, which improves the utilization rate of the light emitted from the light-emitting elements and emits higher brightness backlight through relatively low energy consumption.

18 Claims, 11 Drawing Sheets

(56) References Cited

U.S. PATENT DOCUMENTS

2021/0382225 A1* 12/2021 Kasai .................. G02B 6/0021

FOREIGN PATENT DOCUMENTS

| | | | |
|---|---|---|---|
| CN | 108983499 A | 12/2018 | |
| CN | 212749468 U | 3/2021 | |
| CN | 112882282 A | 6/2021 | |
| DE | 102021006448 A1 * | 6/2022 | ........... G02B 6/0068 |
| JP | 2010176031 A | 8/2010 | |
| WO | 2020258768 A1 | 12/2020 | |

* cited by examiner

BACKLIGHT ASSEMBLY AND FORMATION METHOD THEREOF, AND DISPLAY APPARATUS

CROSS-REFERENCE TO RELATED APPLICATION

This application claims the priority of Chinese Patent Application No. 202111148598.5, filed on Sep. 29, 2021, in the China National Intellectual Property Administration, the content of which is incorporated herein by reference in its entirety.

TECHNICAL FIELD

The present disclosure generally relates to the field of electronic device technology, and, more particularly, relates to a backlight assembly and its formation method, and a display apparatus.

BACKGROUND

With continuous development of science and technology, more display apparatuses are widely used, which brings great convenience and has become one of indispensable and important tools.

The main component of the display apparatus to realize display function is a liquid crystal display module which is one of current mainstream display modules. The liquid crystal display module itself cannot emit light, and image display is performed based on needed backlight provided by a backlight assembly. The backlight assemblies mainly include a direct-lit backlight assembly and an edge-lit backlight assembly. Compared with the edge-lit backlight assembly, the direct-lit backlight assembly can use multiple light-emitting elements arranged in an array to conveniently realize regional backlight adjustment, so that the display apparatus with the direct-lit backlight assembly may have higher brightness and contrast.

The existing direct-lit backlight assembly has low power consumption and brightness due to low utilization rate of the light emitted from light-emitting elements.

SUMMARY

One aspect of the present disclosure provides a backlight assembly. The backlight assembly includes a circuit board; a plurality of light-emitting elements, disposed at a side of the circuit board; and a light guide element, configured to transmit light emitted from the plurality of light-emitting elements to a display element according to a preset light-guiding path.

Another aspect of the present disclosure provides a formation method of a backlight assembly. The method includes forming a light guide plate configured as a light guide element, such that light emitted from a light-emitting element is transmitted to a display element according to a preset light-guiding path; and fixing the light guide plate with a circuit board, where a plurality of light-emitting elements is at a side of the circuit board; the light guide plate is fixed at the side of the circuit board with the plurality of light-emitting elements; the light guide plate includes a plurality of through holes having a one-to-one correspondence with the plurality of light-emitting elements; the light-emitting element is in a corresponding through hole; and a sidewall of the corresponding through hole at least reflects light emitted from a sidewall of the light-emitting element, such that the reflected light exits through the corresponding through hole.

Another aspect of the present disclosure provides a display apparatus. The display apparatus includes a circuit board; a plurality of light-emitting elements, disposed at a side of the circuit board; and a light guide element, configured to transmit light emitted from the plurality of light-emitting elements to a display element according to a preset light-guiding path. The display apparatus further includes a display element at a light-emitting side of the backlight assembly.

Other aspects of the present disclosure can be understood by those skilled in the art in light of the description, the claims, and the drawings of the present disclosure.

BRIEF DESCRIPTION OF THE DRAWINGS

To clearly describe the technical solutions of various embodiments of the present disclosure, the drawings need to be used for describing various embodiments are described below. Obviously, the drawings in the following description are merely some embodiments of the present disclosure. For those skilled in the art, other drawings may be obtained in accordance with these drawings without creative efforts.

The structures, proportions, sizes and the like shown in the drawings in the present disclosure are merely used to cooperate with the contents disclosed in the specification for those skilled in the art to understand the present disclosure and are not intended to limit the implementable condition of the present disclosure and thus have no substantive technical significance. Any modifications of structures, changes of proportional relationship or adjustments of sizes, without affecting the generated effect and achievable objective of the present disclosure, should still fall within the scope that the technical content disclosed in the present disclosure can cover.

DETAILED DESCRIPTION

The technical solutions in embodiments of the present disclosure are clearly and completely described below with reference to the accompanying drawings in embodiments of the present disclosure. Obviously, described embodiments are only a part of embodiments of the present disclosure, but not all embodiments. Based on embodiments in the present disclosure, all other embodiments obtained by those skilled in the art without creative efforts shall fall within the protection scope of the present disclosure.

To make above-mentioned objectives, features and advantages of the present disclosure more clearly understood, the present disclosure is further described in detail below with reference to accompanying drawings and embodiments.

Figure 1:
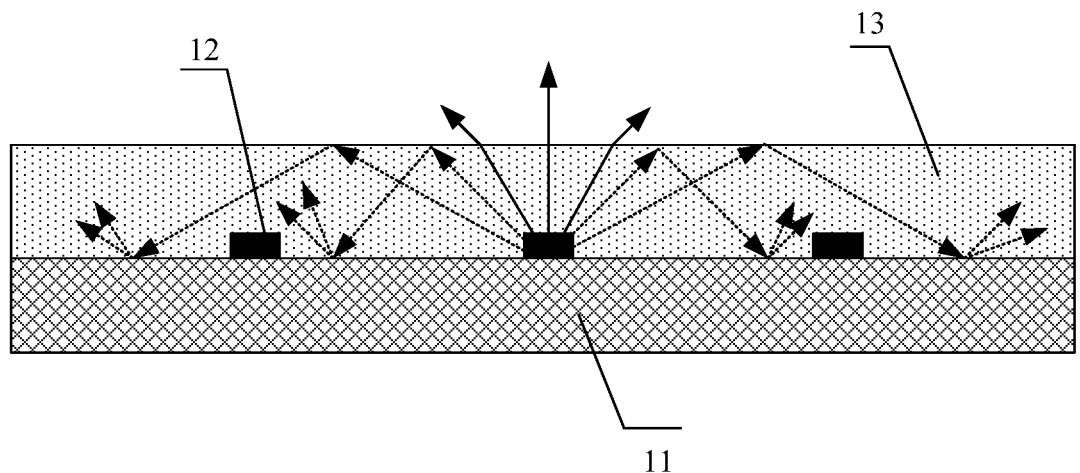
FIG. 1 illustrates a structural schematic of a backlight assembly.

FIG. 1 illustrates a structural schematic of a backlight assembly. The backlight assembly may include a circuit board 11, e.g., printed circuit board (PCB) or flexible printed circuit (FPC); a plurality of light-emitting elements 12 disposed on the surface of the circuit board 11; and a transparent protective adhesive layer 13 which is disposed on the surface of the circuit board 11 and covers the plurality of light-emitting element 12.

The light-emitting element 12 may be a light-emitting diode (LED) including a conventional LED and may also be a miniature LED. The miniature LEDs may include mini-LEDs and micro-LEDs. An array of the plurality of light-emitting elements 12 may be arranged on a same surface of the circuit board 11.

In embodiments of the present disclosure, in the backlight assembly, the light-emitting element 12 is a micro-LED. The light-emitting element 12 may perform regional backlight control based on a display signal of the display apparatus. For example, the backlight assembly may include a plurality of backlight sub-regions; each backlight sub-region may include at least one light-emitting element 12; the light-emitting elements 12 in different backlight sub-regions may be independently controlled to emit light; and the light-emitting elements 12 in a same backlight sub-region may be controlled to emit light synchronously. In such way, independent backlight control of different backlight sub-regions of the backlight assembly may be realized, and regional backlight adjustment may be implemented, thereby improving the contrast ratio of the display apparatus.

The micro-LED may normally be a separated single lamp bead, which is fixed on the surface of the circuit board 11 by welding or conductive adhesive without encapsulation. The transparent protective adhesive layer 13 on the surface of the circuit board 11 may normally only have a function of protecting light transmission and may not have other additional optical functions. In addition, the top of the micro-LED may emit light (as shown by the solid arrow in FIG. 1), and its sidewall may also emit light (as shown by the dashed arrow in FIG. 1). The light emitted from the sidewall may be totally or diffusely reflected in the transparent protective adhesive layer 13, resulting in relatively large light loss. Furthermore, in a backlight sub-region which is currently emitting light, the light emitted from the sidewall of the micro-LED may be emitted through other backlight sub-regions after being totally or diffusely reflected in the transparent protective adhesive layer 13. If the micro-LEDs in other backlight sub-regions are not emitting light at this time, the light may cause the halo problem after passing through the display element. In embodiments of the present disclosure, the display element may be a liquid crystal display module.

The reason for the halo problem of the display apparatus is described below with reference to FIGS. 2 to 4.

Figure 2:
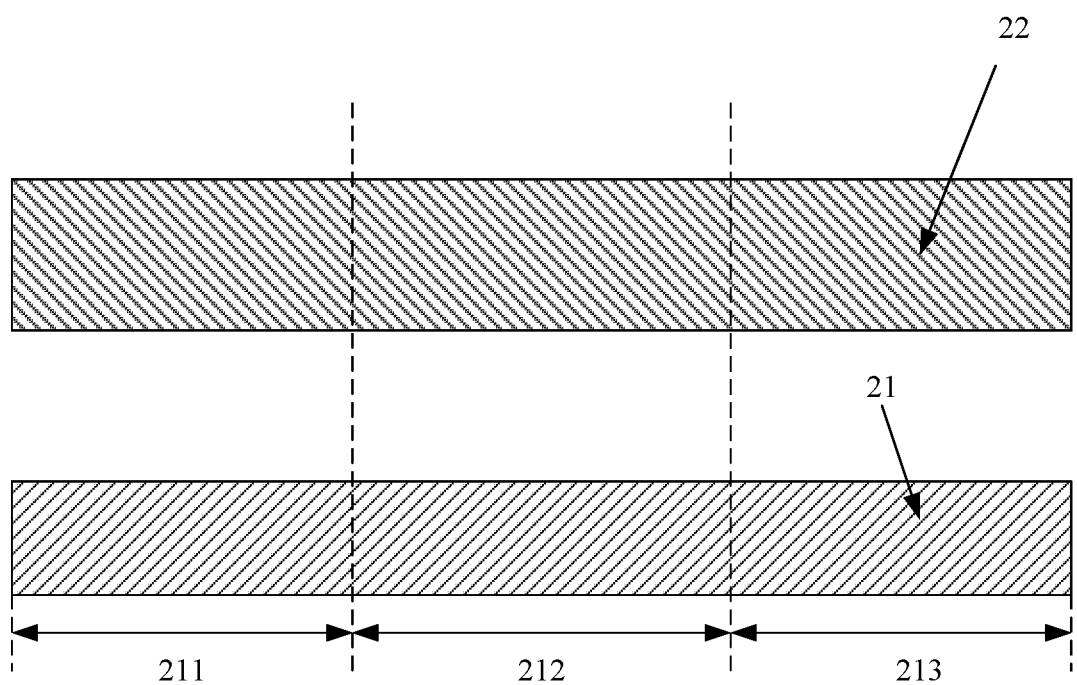
FIG. 2 illustrates a structural schematic of a display apparatus.

FIG. 2 illustrates a structural schematic of a display apparatus; FIG. 3 illustrates a display effect schematic of a halo problem generated by a display apparatus; and FIG. 4 illustrates a schematic of backlight propagation when a display apparatus generates a halo problem. The display apparatus may include a backlight assembly 21 and a display element 22 disposed in a region of the backlight assembly 21 which emits backlight. The backlight assembly 21 may be capable of regional backlight adjustment, including a plurality of backlight sub-regions. In FIG. 2, three backlight sub-regions, including the first backlight sub-region 211, the second backlight sub-region 212 and the third backlight sub-region 213, are exemplarily illustrated. Obviously, the number of backlight sub-regions in the backlight assembly 21 may be configured based on display requirements, and a specific number of backlight sub-regions may not be limited in embodiments of the present disclosure.

Figure 3:
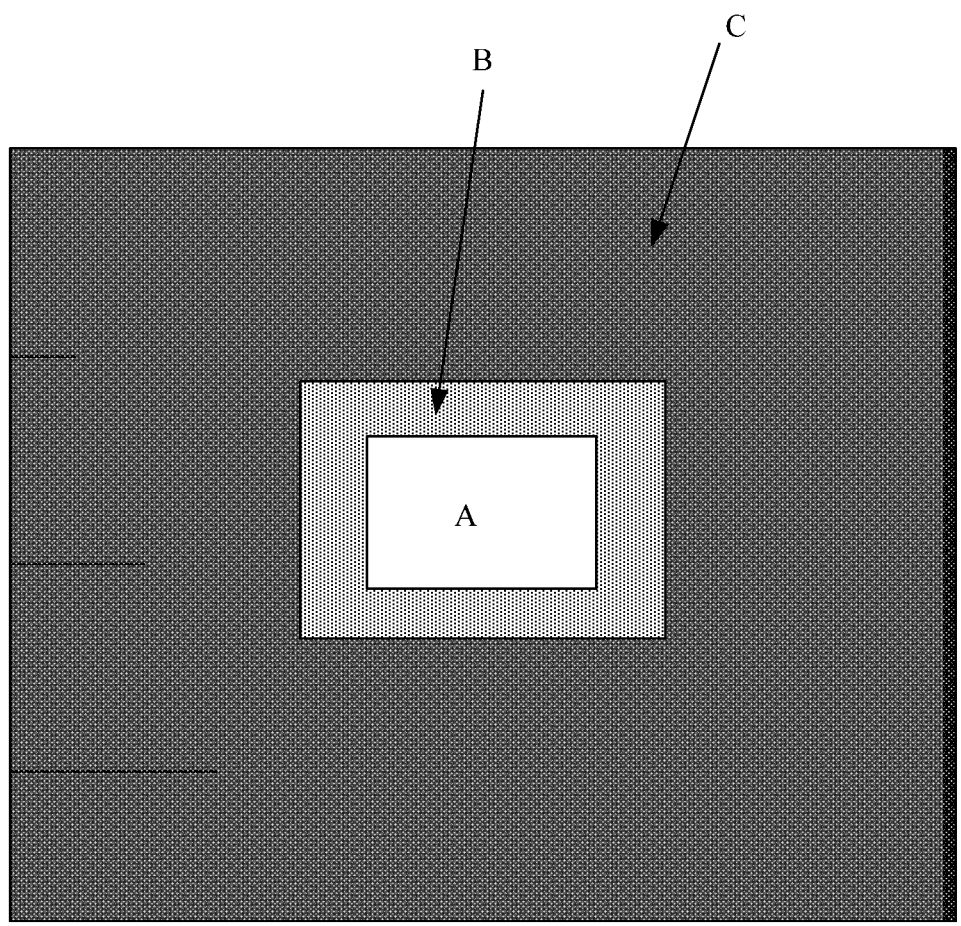
FIG. 3 illustrates a display effect schematic of a halo problem generated by a display apparatus.
Figure 4:
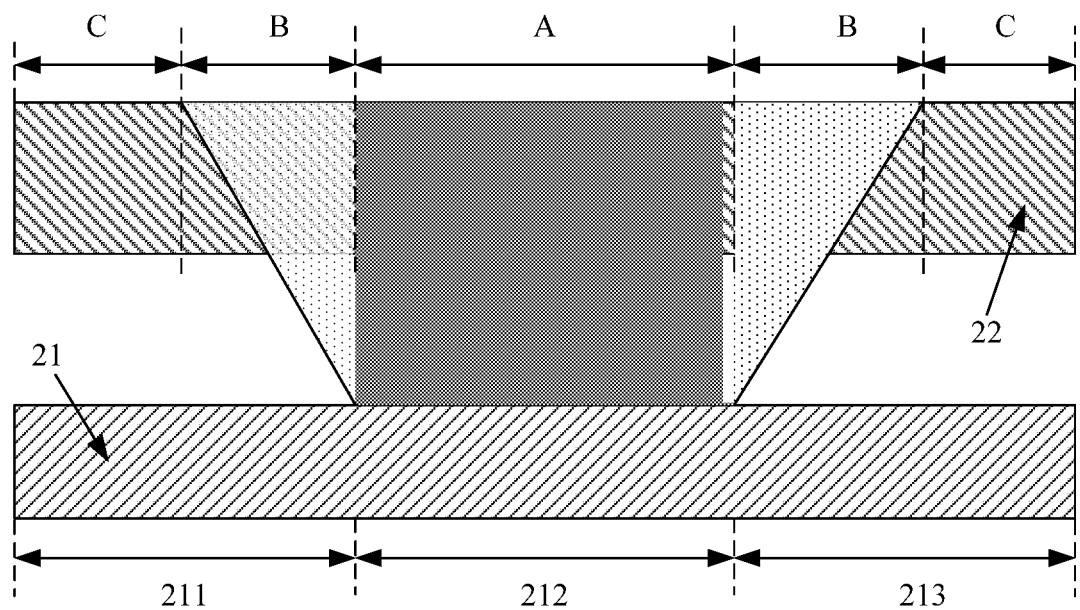
FIG. 4 illustrates a schematic of backlight propagation when a display apparatus generates a halo problem.

As shown in FIGS. 3-4, when it needs to display a white region in a black screen, ideally, it may need that a display region B and a display region C may be black display regions, and a display region A may be a white display region. At this point, it may need that the second backlight sub-region 212 corresponding to the display region A may emit backlight, and all other backlight sub-regions may be turned off to not emit backlight. However, after the light emitted from the sidewalls of the light-emitting elements in the second backlight sub-region 212 undergoes total reflection or diffuse reflection, it may cause a part of the light emitted by the light-emitting elements in the second backlight sub-region 212 to be emitted from other adjacent backlight sub-regions that do not need to emit backlight, such that a halo display region between white and black may be formed in the display region B.

In order to solve above-mentioned problems, embodiments of the present disclosure provide a backlight assembly. The backlight assembly may include a circuit board; a plurality of light-emitting elements disposed at a side of the circuit board; and a light guide element, which is used for transmitting the light emitted from the light-emitting element to the display element according to a preset light-guiding path.

In the backlight assembly, the light guide element may be provided. The light guide element may be used to transmit the light emitted by the light-emitting element to the display element according to a preset light-guiding path, which can improve the utilization rate of the light emitted from the light-emitting element and emit higher brightness backlight through relatively low energy consumption. In addition, based on adjustment of the light path by the light guide element, the light emitted from the light-emitting element in the backlight sub-region that needs to exit the backlight may be prevented from exiting through other backlight sub-regions that do not need to exit the backlight, light crosstalk problems in different backlight sub-regions may be prevented, such that the halo problem when the display apparatus performs image display may be prevented.

Figure 5:
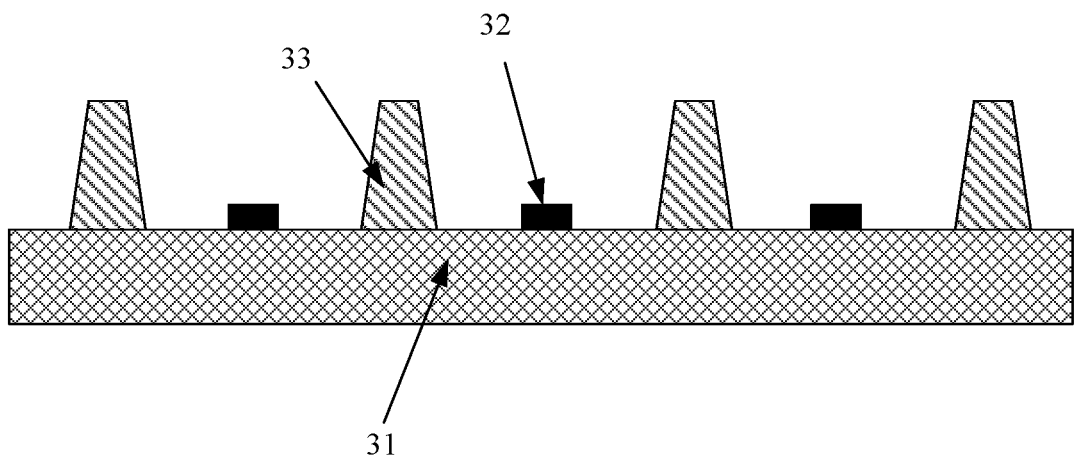
FIG. 5 illustrates a cross-sectional view of an exemplary backlight assembly according to various disclosed embodiments of the present disclosure.
Figure 6:
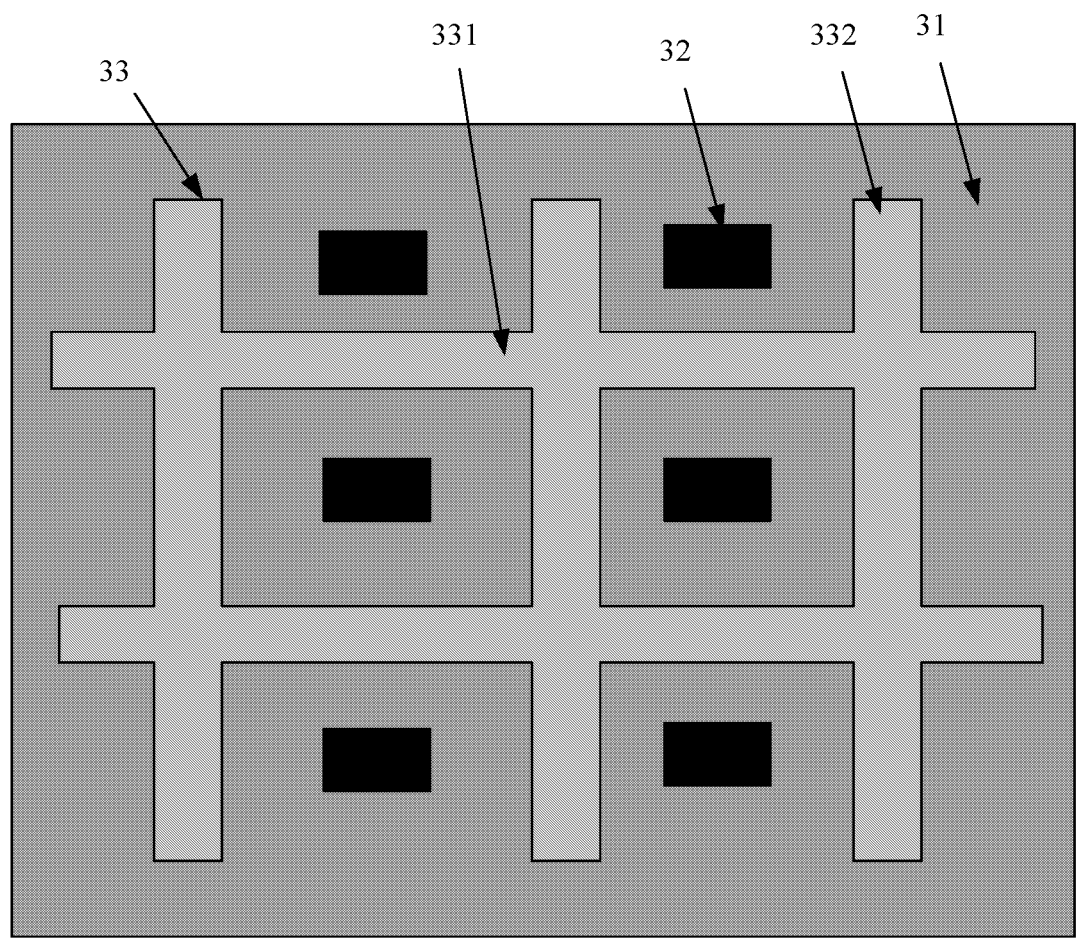
FIG. 6 illustrates a top view of an exemplary backlight assembly according to various disclosed embodiments of the present disclosure.

FIG. 5 illustrates a cross-sectional view of an exemplary backlight assembly according to various disclosed embodiments of the present disclosure; and FIG. 6 illustrates a top view of an exemplary backlight assembly according to various disclosed embodiments of the present disclosure.

The backlight assembly may include a circuit board 31; a plurality of light-emitting elements 32 disposed at a side of the circuit board 31, where the circuit board 31 may be a PCB or an FPC, and the light-emitting elements 32 may be light-emitting diodes, including conventional LEDs and micro-LEDs; and further include a light guide element configured to transmit the light emitted from the light-emitting element 32 to the display element according to a preset light-guiding path. The side of the light guide element facing away from the circuit board 31 may be used for disposing the display element; and the light guide element and the light-emitting element 32 may be between the circuit board 31 and the display element.

In the manner shown in FIGS. 5-6, the light guide element may include blocking walls 33 fixed on the surface of the circuit board 31. The blocking walls 33 may include the first blocking wall 331 extending along the first direction and the second blocking wall 332 extending along the second direction, where the first direction and the second direction may satisfy a vertical condition, including vertical or approximately vertical. The first blocking walls 331 and the second blocking walls 332 may be integrally formed (e.g., as a single one piece) on the surface of the circuit board 31 by printing or injection molding and may intersect to define a plurality of backlight sub-regions. Each backlight sub-region may include at least one light-emitting element 32. One or more light-emitting elements 32 may be disposed in the backlight sub-region, and embodiments of the present disclosure may not limit the number of light-emitting elements 32 in the backlight sub-region.

The height of the blocking wall 33 is greater than the height of the light-emitting element 32 which may block and reflect the light. Therefore, the light emitted from the sidewall of the light-emitting element 32 may be emitted toward the display element, which may avoid the halo problem caused by the light crosstalk in different backlight sub-regions and improve light extraction efficiency. Optionally, the width of the blocking wall 33 may be configured to gradually decrease along the direction pointing from the circuit board 31 to the light-emitting element 32 to form an inclined plane, so that more light reflected by the blocking wall 33 may be emitted toward the display element, and the number of light reflections in the light guide element may be reduced, thereby improving light extraction efficiency.

In such way, the light-emitting path of the light-emitting element 32 may be adjusted by the blocking wall 33, so that more light emitted from the light-emitting element 32 may be emitted toward the display element, the light emitted from the sidewall of the backlight assembly may be reduced, the backlight emitting efficiency may be improved, and the light crosstalk in different backlight sub-regions may also be avoided, thereby solving the halo problem. Moreover, due to the light path adjustment function of the blocking wall 33, the backlight assembly may not need to be disposed with a beam splitter (e.g., a beam splitting film), thereby reducing the thickness and formation cost of the backlight assembly.

Figure 7:
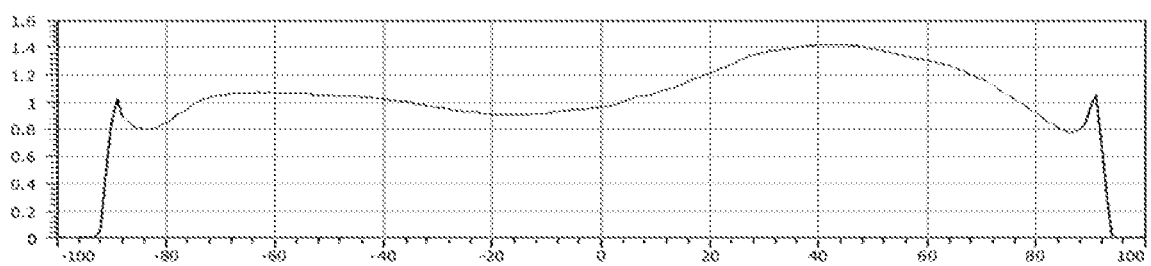
FIG. 7 illustrates a graph of light-emitting angle and light-emitting intensity of a light-emitting element according to various disclosed embodiments of the present disclosure.

FIG. 7 illustrates a graph of light-emitting angle and light-emitting intensity of a light-emitting element according to various disclosed embodiments of the present disclosure. The mini-LED is used as the light-emitting element 32, the horizontal axis is the light-emitting angle, the vertical axis is the light-emitting intensity, and the light-emitting intensity varies with the light-emitting angle. In order to ensure a relatively uniform backlight output and avoid the side light output of the backlight sub-region and the side light output of the backlight assembly, same mini-LEDs may be used in the backlight assembly, and the blocking walls 33 with a same dimension parameter may be used. The structure and size of the blocking wall may be configured based on requirements, thereby being adapted to the dimension of the light-emitting element 32. The light-emitting element 32 may be spherical, elliptical, or rectangular.

Figure 8:
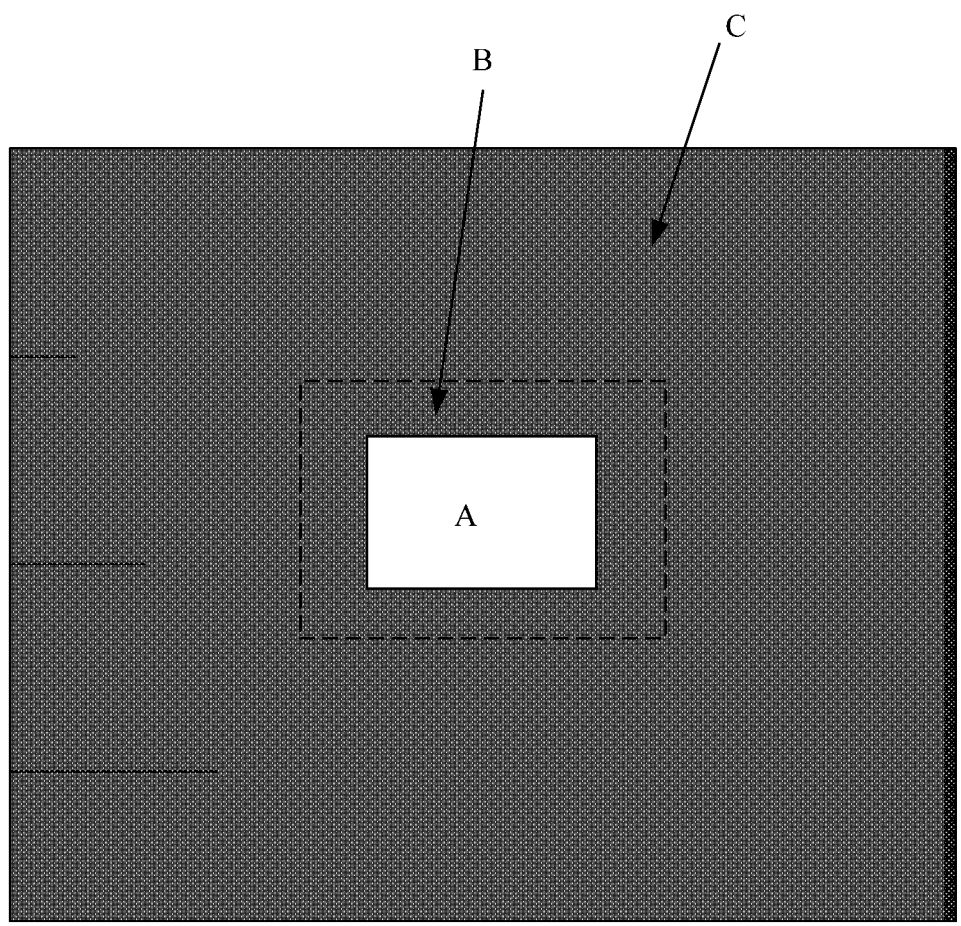
FIG. 8 illustrates a display effect schematic of a display apparatus of an exemplary backlight assembly according to various disclosed embodiments of the present disclosure.
Figure 9:
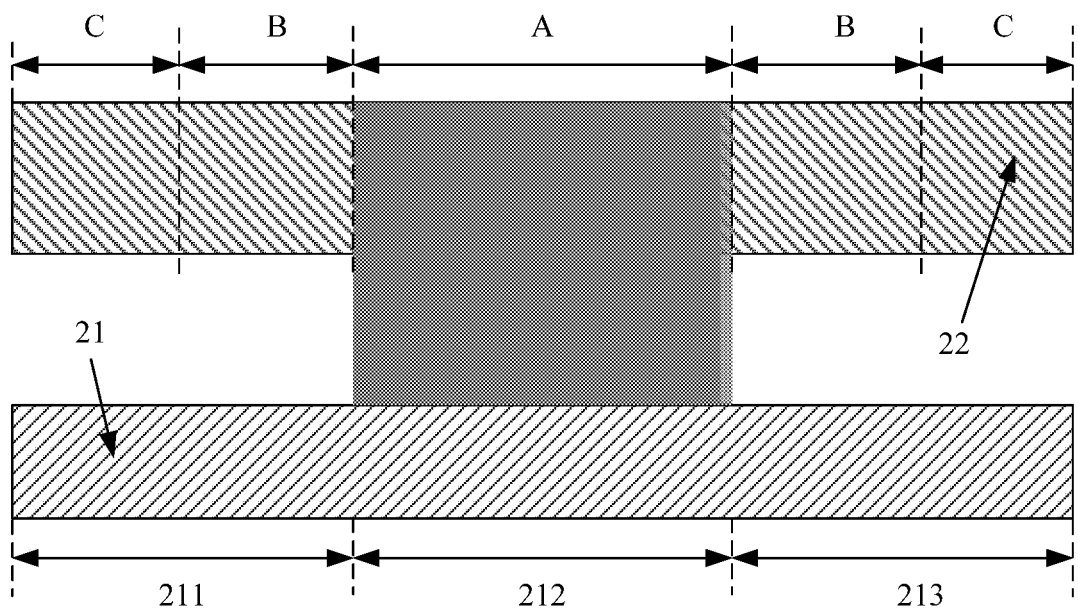
FIG. 9 illustrates a schematic of backlight propagation in a display apparatus shown in FIG. 8.

FIG. 8 illustrates a display effect schematic of a display apparatus of an exemplary backlight assembly according to various disclosed embodiments of the present disclosure; and FIG. 9 illustrates a schematic of backlight propagation in a display apparatus shown in FIG. 8. The backlight assembly 21 with the light guide element may be used, which may avoid crosstalk of light in different backlight sub-regions, thereby solving the halo problem. It should be noted that the dashed box in FIG. 8 is only used to indicate the boundary division of different display regions. In actual display, since the halo problem is solved, the dashed box boundary does not exist.

It can be noted from the above description that the first blocking walls 331 and the second blocking walls 332 may intersect to define the plurality of backlight sub-regions, and the blocking wall 33 surrounding each backlight sub-region may be equivalent to a light mask, which can adjust the light exit path. In such way, the light emitted from the light-emitting element 32 in a same light mask may all be directed toward the display element, a beam splitter may not need to be installed, and it may only need to make the light exit more uniformly through an ordinary diffuser, thereby reducing the formation cost. Moreover, by using the light mask, the light extraction efficiency may be improved, and the backlight light intensity may be larger under a same power, which may save power consumption.

For the above-mentioned method, through specially encapsulated light-emitting element 32, the light-emitting angle of the light-emitting element 32 may be changed from emitting through the top center to emitting through the surrounding area at a large angle, light crosstalk may be prevented by surrounding blocking walls 33, and the light emitted from a large angle may be reflected and then emitted toward the display element.

Figure 10:
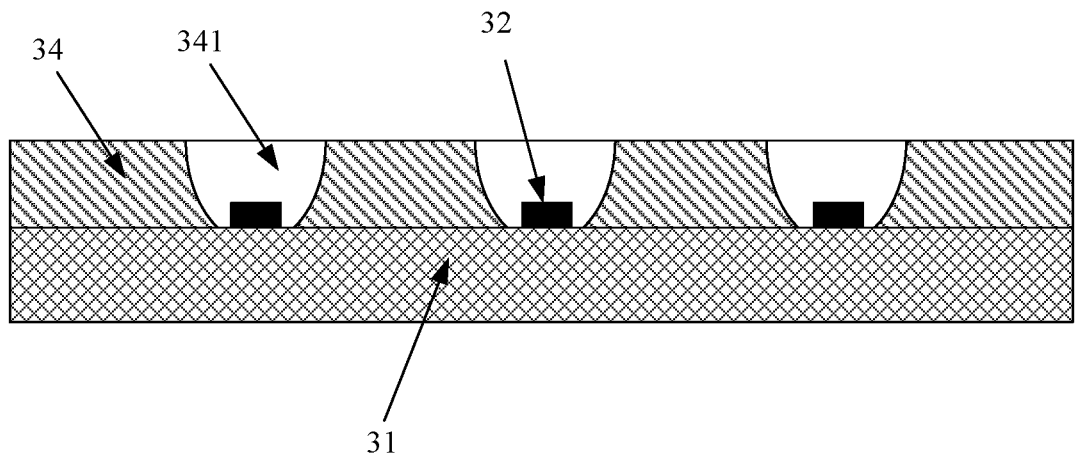
FIG. 10 illustrates another cross-sectional view of an exemplary backlight assembly according to various disclosed embodiments of the present disclosure.
Figure 11:
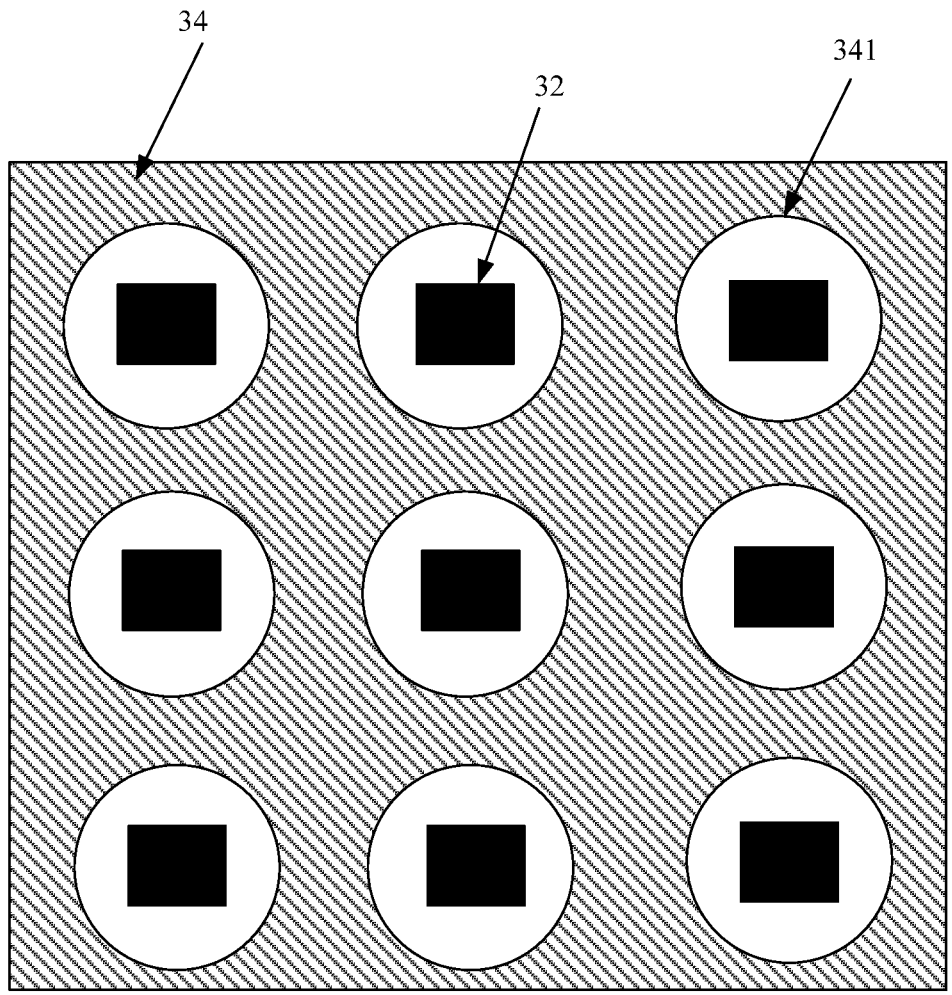
FIG. 11 illustrates another top view of an exemplary backlight assembly according to various disclosed embodiments of the present disclosure.

FIG. 10 illustrates another cross-sectional view of an exemplary backlight assembly according to various disclosed embodiments of the present disclosure; and FIG. 11 illustrates another top view of an exemplary backlight assembly according to various disclosed embodiments of the present disclosure. In such manner, the backlight assembly may include the circuit board 31 disposed with a plurality of light-emitting elements 32, and a light guide element including a light guide plate 34. The light guide plate 34 may be fixed on the side of the circuit board 31 with the light-emitting elements 32 and have a plurality of through holes 341; and the through hole 341 may include at least one light-emitting element 32 therein. The sidewall of the through hole 341 may at least reflect the light emitted from the sidewall of the light-emitting element 32, so that the reflected light may exit through the opening of the through hole 341 away from the circuit board 31. The backlight assembly may be divided into a plurality of backlight sub-regions by through holes; and each through hole may be a backlight sub-region.

In the method shown in FIG. 10, the exit path of the light emitted from the light-emitting element 32 inside the through hole 341 may be adjusted through the reflection by the sidewall of the through hole 341, which may also avoid the problem of light crosstalk in different backlight sub-regions, further solve the halo problem of display, improve the light output efficiency of the backlight, and realize a higher backlight brightness under a same power consumption.

In addition, compared with above-mentioned blocking wall manner, the circuit board 31 and the light guide plate 34 may be independently formed in the method shown in FIG. 10, which may be convenient for mass production of the backlight assembly. The light guide plate 34 may be fixed on the surface of the circuit board 31 through an adhesive layer, which may improve the strength of the backlight assembly. Moreover, based on the plate-shaped light guide plate 34, the side facing the circuit board 31 and the side away from the circuit board 31 may both be flat, which may be convenient for adhering and fixing with the circuit board 31 and for fixing other optical elements on the side surface facing away from the circuit board 31.

In order to realize the reflection function of the sidewall of the through hole 341, the sidewall of the through hole 341 may be covered with a reflective film. The reflective film may be a thin metal film.

Figure 12:
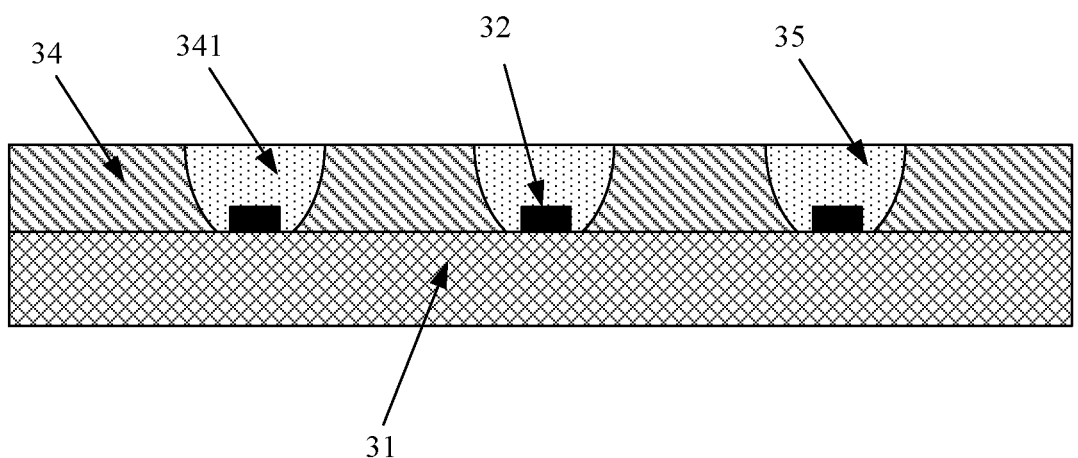
FIG. 12 illustrates another cross-sectional view of an exemplary backlight assembly according to various disclosed embodiments of the present disclosure.
Figure 13:
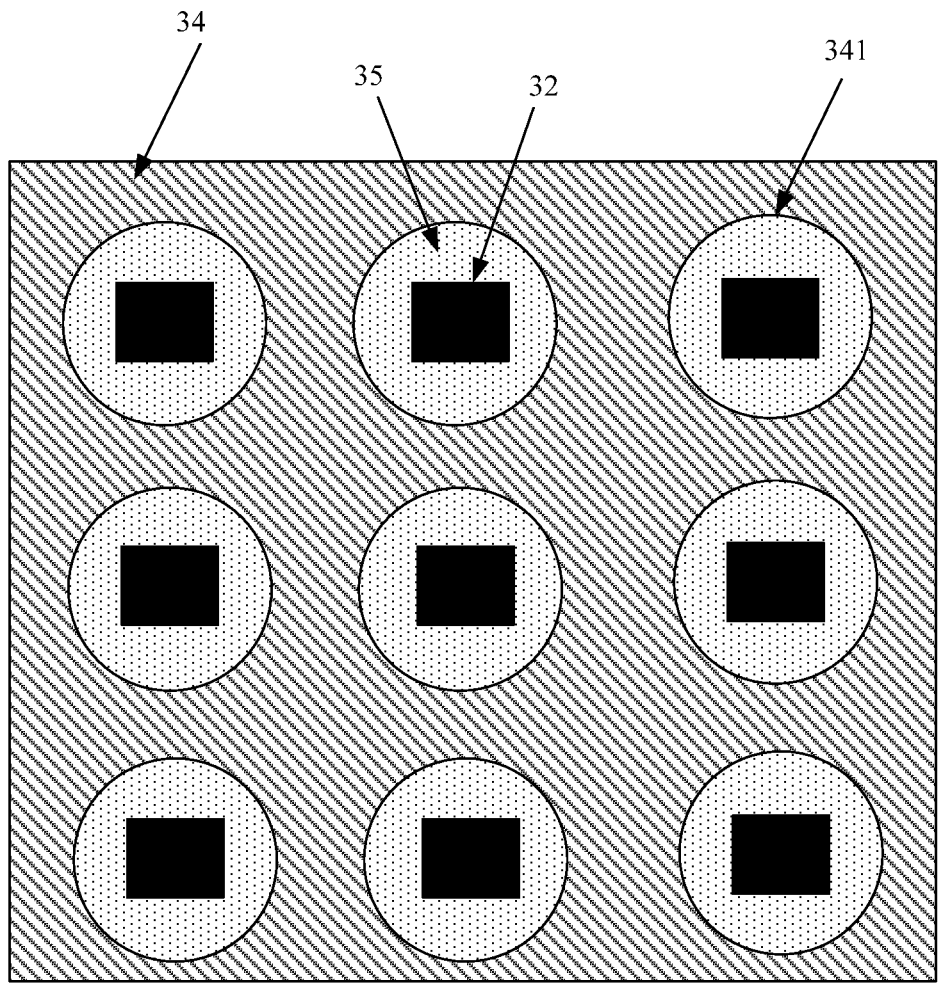
FIG. 13 illustrates another top view of an exemplary backlight assembly according to various disclosed embodiments of the present disclosure.

FIG. 12 illustrates another cross-sectional view of an exemplary backlight assembly according to various disclosed embodiments of the present disclosure; and FIG. 13 illustrates another top view of an exemplary backlight assembly according to various disclosed embodiments of the present disclosure. In one embodiment, the light guide plate 34 may be configured to be a first material which is colorless and light-transmitting; the through hole 341 may be filled with a second material 35 which is colorless and light-transmitting; and the second material 35 may cover the light-emitting element 32. The refractive index of the first material may be less than the refractive index of the second material 35.

The first material may be one or a combination of PMMA (Poly (methyl methacrylate, plexiglass), PC (polycarbonate), and/or PBS (polybutylene succinate); and the second material 35 may be one of resin and/or silica gel.

The refractive index of the first material is less than the refractive index of the second material 35. Therefore, the light emitted from the sidewall of the light-emitting element 32 may have total reflection at the interface of the first material and the second material 35 due to at least a part of the light incident from the optically denser medium to the optically sparser medium, such that the light may exit toward the display element through the opening of the through hole 341. For such manner, it may not only realize light reflection, so that the light emitted from the sidewall of the light-emitting element 32 may be reflected and emitted through the opening of the through hole 341, thereby implementing adjustment of the transmission path of the light emitted from the light-emitting element 32; and the sealing protection of the light-emitting element 32 may also be achieved through the second material 35.

In embodiments of the present disclosure, one through hole 341 may be disposed with one or more light-emitting elements 32 therein. Optionally, one light-emitting element 32 may be correspondingly disposed in one through hole 341. In such way, a plurality of individual light-emitting elements 12 may be independently sealed and protected, and more regional backlight division may be achieved.

The sidewall of the through hole 341 may be configured as a curved surface. The curved surface may be bent toward the through hole 341, that is, the curvature center of the curved surface may be located in the through hole, which may be convenient for realizing that the large-angle light emitted to the sidewall of the light-emitting element 12 may exit after being converged toward the opening of the through hole 341. Optionally, the sidewall of the through hole 341 may be configured to be a spherical surface or an ellipsoid surface, which may be convenient for the preparation of the through hole 341 and realizing the function of the through hole 341 for converging light.

The thickness of the light guide plate 34 may be configured to be greater than the thickness of the light-emitting element 32, which may ensure better reflection of the light emitted from the sidewall of the light-emitting element 32 and improve the light output efficiency of the backlight. Based on the conventional thickness of current micro-LEDs, in embodiments of the present disclosure, the thickness of the light guide plate 34 may be configured to be about 0.3 mm or greater than 0.3 mm.

The width (diameter) of the through hole 341 may be configured to be greater than the width of the light-emitting element 32. Furthermore, the width of the through hole 341 be configured to be greater than twice width of the light-emitting element 32.

In embodiments of the present disclosure, the light-emitting element 32 may emit blue light; and the first light adjustment part may be disposed at a light-emitting side of the light-emitting element 32. The first light adjustment part configured to form a white backlight based on the blue light emitted from the light-emitting element 32.

The second light adjustment part may be disposed at the side of the light guide element away from the circuit board 31. The second light adjustment part may be configured to adjust the light exit angle and uniformity, thereby improving the brightness and uniformity of the backlight emitted from the backlight assembly.

The backlight assembly may be configured to have one or two of the first light adjustment part and the second light adjustment part. When both the first light adjustment part and the second light adjustment part are disposed, the second light adjustment part may be on the light-emitting side of the first light adjustment part.

Figure 14:
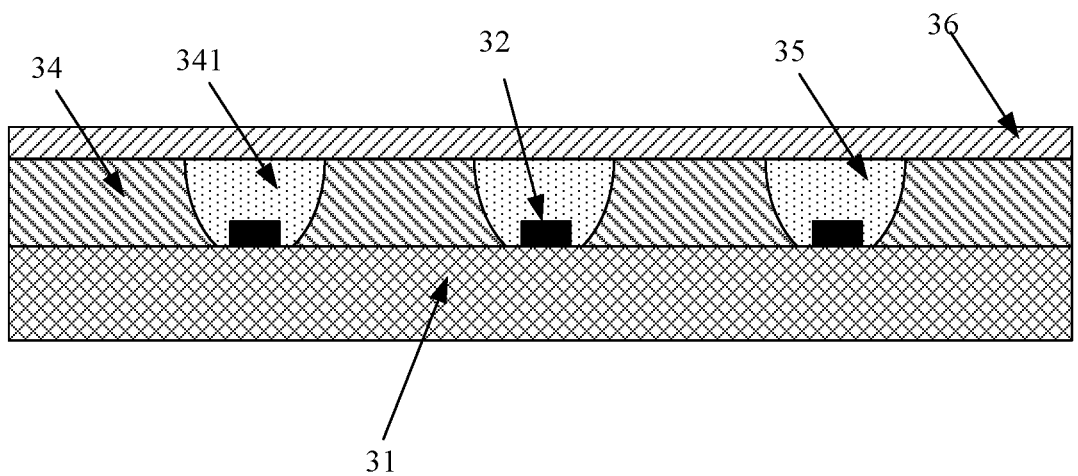
FIG. 14 illustrates another cross-sectional view of an exemplary backlight assembly according to various disclosed embodiments of the present disclosure.

FIG. 14 illustrates another cross-sectional view of an exemplary backlight assembly according to various disclosed embodiments of the present disclosure. In such manner, the first light adjustment part may include a quantum dot film 36 on the side of the light guide element away from the circuit board. Such manner is illustrated by taking the light guide element shown in FIG. 12 as an example. Obviously, the quantum dot film 36 may also be disposed on the basis of other light guide elements in embodiments of the present disclosure. In embodiments of the present disclosure, the quantum dot film 36 may emit white backlight based on incident blue light.

Figure 15:
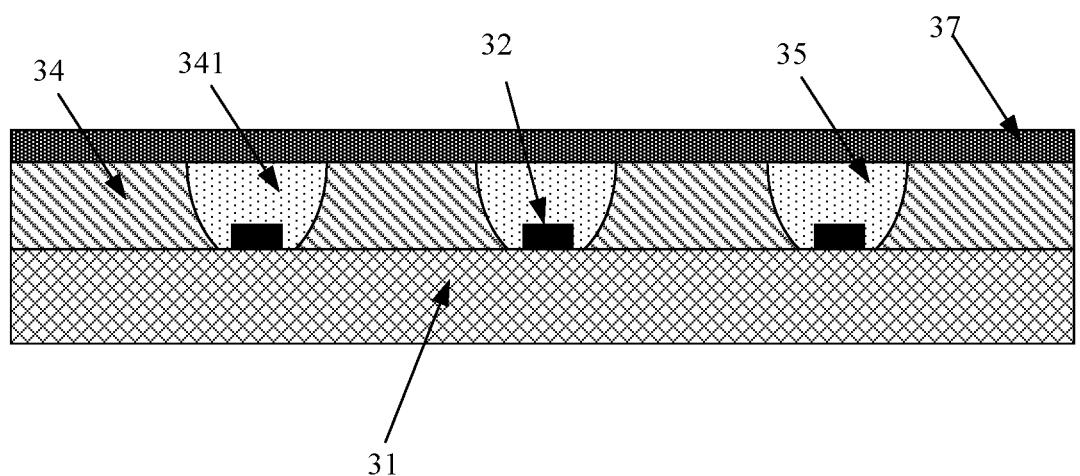
FIG. 15 illustrates another top view of an exemplary backlight assembly according to various disclosed embodiments of the present disclosure.

FIG. 15 illustrates another top view of an exemplary backlight assembly according to various disclosed embodiments of the present disclosure. In such manner, the first light adjustment part may include a fluorescent layer 37 on the side of the light guide element away from the circuit board 31. Such manner is illustrated by taking the light guide element shown in FIG. 12 as an example. Obviously, the fluorescent layer 37 may also be provided on the basis of other light guide elements in embodiments of the present disclosure. The fluorescent layer 27 may include an adhesive layer and fluorescent powder mixed in the adhesive layer. The fluorescent powder described in embodiments of the present disclosure may emit white backlight based on incident blue light.

Figure 16:
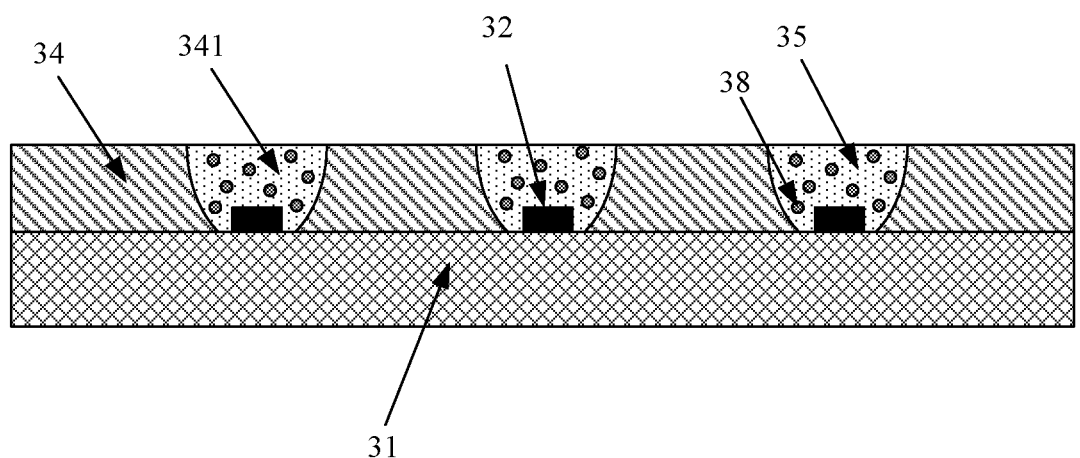
FIG. 16 illustrates another cross-sectional view of an exemplary backlight assembly according to various disclosed embodiments of the present disclosure.

FIG. 16 illustrates another cross-sectional view of an exemplary backlight assembly according to various disclosed embodiments of the present disclosure. In such manner, the light guide element may be the light guide plate 34 fixed on the surface of the circuit board 31 and may include a through hole 341; the through hole 341 may include the light-emitting element 32; the light guide plate 34 may be the first material which is colorless and light-transmitting; the through holes 341 may be filled with the second material 35 which is colorless and light-transmitting, and the second material 35 may be mixed with fluorescent powder 38; the refractive index of the first material may be less than the refractive index of the second material; and the first light adjustment part may include the second material 35 and the fluorescent powder 38. Such manner may not only realize the encapsulation and fixation of the light-emitting element 32 through the second material 35, but also realize the total reflection to implement the adjustment of the light transmission path; and the second material 35 may be reused as a base material for fluorescent powder and mixed with fluorescent powder to achieve white backlight output.

Figure 17:
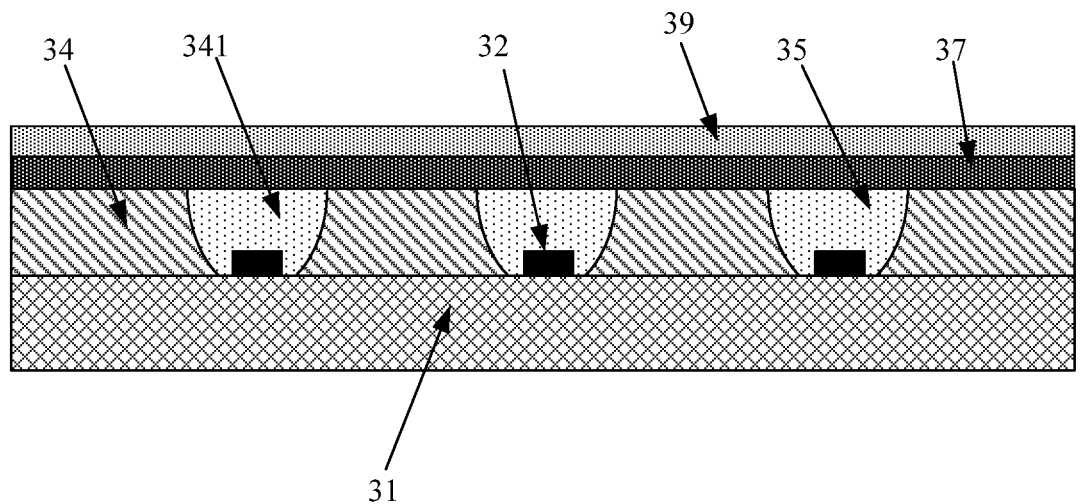
FIG. 17 illustrates another top view of an exemplary backlight assembly according to various disclosed embodiments of the present disclosure.

FIG. 17 illustrates another top view of an exemplary backlight assembly according to various disclosed embodiments of the present disclosure. In such manner, the first light adjustment part (or the fluorescent layer) 37 may be disposed on the side of the light guide element facing away from the circuit board 31, and the second light adjustment part 39 may be disposed on the side of the first light adjustment part 37 facing away from the light guide element. In such manner, the second light adjustment part 39 may be disposed on the basis of the first light adjustment element 37 shown in FIG. 15 for illustration. Obviously, the second light adjustment part 39 may also be disposed on the basis of other first light adjustment elements in embodiments of the present disclosure.

In embodiments of the present disclosure, the second light adjustment part 39 may include a beam splitter on the side of the first light adjustment part away from the light guide element. The side surface of the light-splitting film facing away from the light-emitting element 32 may have an inverted conical groove, for example, the inverted conical groove may be an inverted triangular pyramid. The light-emitting element 32 at each side of the inverted triangular pyramid may form two images, used as light source points, and then 6 light source points may be formed corresponding to the one light-emitting element 32, thereby improving the uniformity of the emitted light. The second light adjustment part 39 may further include a condenser (e.g., a beam condensing sheet), which may be located on the side of the beam splitter away from the first light adjustment part and may gather large-angle emitting light and improve the brightness of the emitting backlight. The second light adjustment part 39 may further include a diffuser (e.g., a diffusion sheet), where the diffuser may be on the side of the condenser away from the beam splitter for improve the uniformity of the emitted light.

When the first light adjustment part is on the side of the light guide element away from the circuit board 31, the backlight assembly may further include a blue film between the first light adjustment part and the light guide element, configured to transmit blue light and reflect other color light, thereby improving the light output efficiency of backlight. When the quantum dot film is used as the first light adjustment part, the quantum dot film may be attached and fixed on the side of the blue film away from the circuit board 31.

Based on above-mentioned embodiments, another embodiment of the present disclosure also provides a formation method of the backlight assembly. The formation method may include following exemplary steps.

At S11, an integrated light guide plate, used as a light guide element, may be formed, so that the light emitted from the light-emitting element may be transmitted to the display element according to a preset light-guiding path.

At S12, the light guide plate and the circuit board may be fixed, and a plurality of light-emitting elements may be disposed on the side of the circuit board. The light guide plate and the circuit board may be fixed and adhered by an adhesive layer.

The light guide plate may be fixed on the side of the circuit board with the light-emitting element; and the light guide plate may have a plurality of through holes having a one-to-one correspondence with the light-emitting elements. The light-emitting element may be located in a corresponding through hole, and the sidewall of the through hole may at least reflect the light emitted from the sidewall of the light-emitting element, so that the reflected light may exit through the through hole. The sidewall of the through hole may be a curved surface bent toward the through hole for forming a micro bowl-shaped structure. By filling the through hole with a light-transmitting material with a high refractive index and adjusting the critical angle of total reflection and using the light transmission path of total reflection adjustment, the convergence and light mixing effect of the light emitted from the light-emitting element in the through hole may be realized.

The light guide plate may be formed by any manners, including injection molding, hot pressing, engraving, injection molding, and the like.

In such formation method, the light guide plate in above-mentioned embodiments may be used as the light guide element; and the circuit board and the light guide plate may be separately formed separately, which may be convenient for mass production of the backlight assembly and also increase mechanical strength of the backlight assembly. Moreover, by adjusting the curvature of the sidewall of the through hole, the light emitted from the light-emitting element may be converged and guided toward one side of the display element to prevent light loss and crosstalk. The total reflection of the light from the sidewall of the through hole may also be achieved by total reflection by selecting materials with different refractive indices. The light convergence and light mixing effect may be changed by adjusting sidewall curvature.

Figure 18:
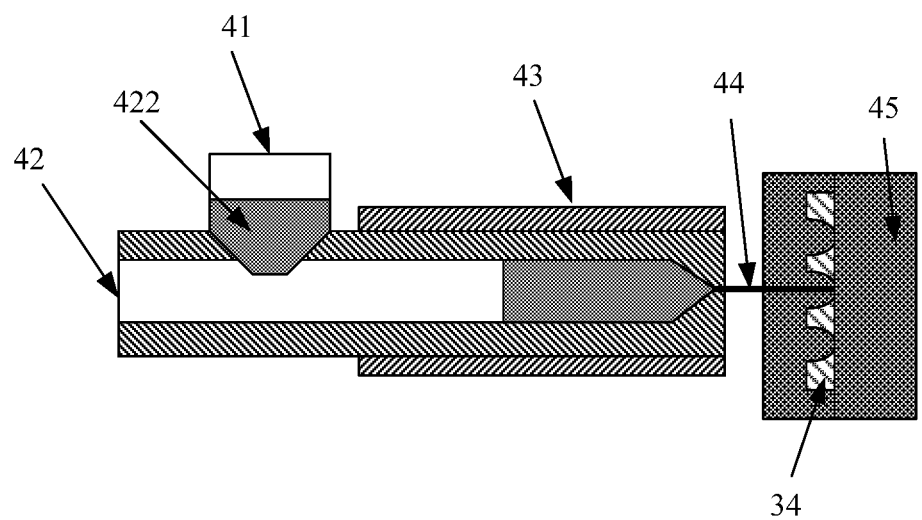
FIG. 18 illustrates a structural schematic of a light guide plate formed according to various disclosed embodiments of the present disclosure.

FIG. 18 illustrates a structural schematic of a light guide plate formed according to various disclosed embodiments of the present disclosure. In such manner, the light guide plate may be formed by an injection molding process. After a first material 422 in a feed barrel 41 enters a pushing device and is heated and melted by a heater 43, the first material may be injected into a mold 45 through a nozzle 44 by the pushing force of a plug 42 and formed into the light guide plate 34 with a desired structure in a mold 45.

Figure 19:
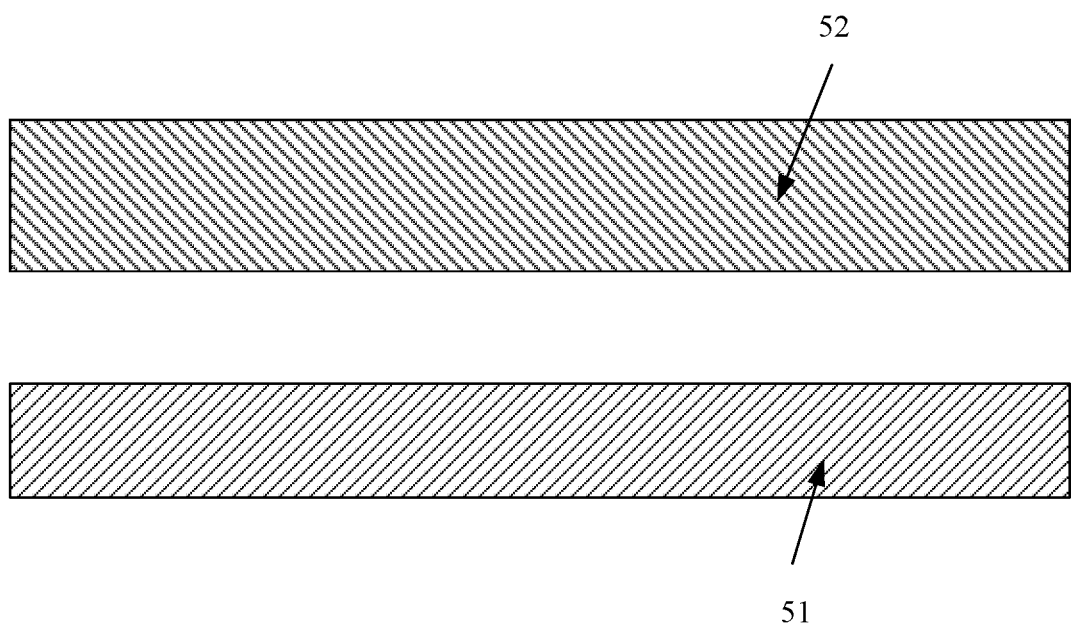
FIG. 19 illustrates a structural schematic of an exemplary display apparatus according to various disclosed embodiments of the present disclosure.

FIG. 19 illustrates a structural schematic of an exemplary display apparatus according to various disclosed embodiments of the present disclosure. The display apparatus may include the backlight assembly 51 described in any one of above-mentioned embodiments and the display element 52 on the light-emitting side of the backlight assembly 51.

The display apparatus may be an electronic device with a display function, such as a mobile phone, a tablet computer, a smart wearable device, or the like.

The display apparatus of embodiments of the present disclosure may use the backlight assembly of above-mentioned embodiments, and the light propagation path may be adjusted through the light guide element, thereby solving the problem of light emission from the side of the backlight assembly and light crosstalk in different backlight sub-regions, improving light output efficiency of the backlight, and solving the halo problem of the display apparatus.

For the backlight assembly and its formation method, and the display apparatus are provided in the present disclosure, the backlight assembly includes the circuit board; the plurality of light-emitting elements, disposed at the side of the circuit board; and the light guide element, configured to transmit light emitted from the plurality of light-emitting elements to the display element according to the preset light-guiding path. The backlight assembly may transmit the light emitted from the light-emitting elements to the display element according to the preset light-guiding path through the light guide element, which may improve the utilization rate of the light emitted by the light-emitting elements and emit higher brightness backlight through relatively low energy consumption.

Various embodiments of the present disclosure are described in a progressive manner, or in a parallel manner, or in a combination of progressive and parallel manners. Each embodiment may focus on differences from other embodiments, and same and similar parts between various embodiments may be referred to each other. For the formation method and the display apparatus disclosed in embodiments of present disclosure, since they correspond to the backlight assembly disclosed in embodiments of present disclosure, the description may be relatively simple, and relevant detail may refer to the description of corresponding parts of the base material.

It should be noted that, in the description of the present disclosure, it should be understood that the orientation or positional relationship indicated by the terms upper", "lower", "top", "bottom", "inner", "outer" and the like which is based on the orientation or positional relationship shown in the drawings may be merely for the convenience of describing the present disclosure and simplifying the description, rather than indicating or implying that indicated device or element must have a specific orientation, be constructed and operated in a specific orientation; therefore, it should not be understood as a limitation on the present disclosure. When a component is "connected" to another component, it may be directly connected to another component or there may be a centered component at the same time.

It should also be noted that in the present disclosure, relational terms such as first, second and the like may be merely used to distinguish one entity or operation from another entity or operation and may not necessarily require or imply any such actual relationship or order between these entities or operations. Moreover, the terms "include", "contain" or any other variations thereof may be intended to cover non-exclusive inclusion, so that a process, method, article, or equipment that includes a series of elements includes not only those elements, but also other elements that are not explicitly listed, or also includes elements inherent to the process, method, article, or equipment. If there are no more restrictions, the elements defined by the sentence "include a . . . " does not exclude the existence of other same elements in the process, method, article, or equipment that includes the elements.

Above description of disclosed embodiments may enable those skilled in the art to make or use the present disclosure. Various modifications to these embodiments may be readily apparent to those skilled in the art, and the generic principles defined herein may be implemented in other embodiments without departing from the spirit or scope of the present disclosure. Therefore, the present disclosure may not be intended to be limited to embodiments of the present disclosure but may be accorded the widest scope consistent with the principles and novel features disclosed herein.

What is claimed is:

1. A backlight assembly, comprising:
a circuit board;
a plurality of light-emitting elements, disposed at a side of the circuit board; and
a light guide element, configured to transmit light emitted from the plurality of light-emitting elements to a display element according to a preset light-guiding path guiding light from the light-emitting elements to the display element, the light guide element including a light guide plate fixed on the side of the circuit board with the plurality of light-emitting elements, wherein, the light guide plate includes a plurality of through holes; and a through hole of the plurality of through holes includes at least one light-emitting element; a sidewall of the through hole at least reflects light emitted from a sidewall of a light-emitting element, such that the reflected light exits through an opening of the through hole away from the circuit board.

2. The backlight assembly according to claim 1, wherein:
the light guide plate is made of a first material which is colorless and light-transmitting; the through hole is filled with a second material which is colorless and light-transmitting; and the second material covers the light-emitting element, wherein a refractive index of the first material is less than the refractive index of the second material.

3. The backlight assembly according to claim 2, wherein:
the first material is one of PMMA (poly (methyl methacrylate), PC (polycarbonate), or PBS (polybutylene succinate); and
the second material is one of resin or silica gel.

4. The backlight assembly according to claim 1, at least including:
the sidewall of the through hole is a curved surface which is bent toward the through hole;
a thickness of the light guide plate is greater than a thickness of the light-emitting element; or
a width of the through hole is greater than a width of the light-emitting element.

5. The backlight assembly according to claim 1, wherein:
a light-emitting element of the plurality of light-emitting elements emits blue light; and a first light adjustment part is disposed at a light-emitting side of the light-emitting element and configured to exit white light based on the blue light emitted from the light-emitting element; and/or a second light adjustment part is disposed at a side of the light guide element away from the circuit board and configured to adjust a light exit angle and uniformity.

6. The backlight assembly according to claim 5, wherein:
the first light adjustment part includes a quantum dot film at the side of the light guide element away from the circuit board; or
the first light adjustment part includes a fluorescent layer at the side of the light guide element away from the circuit board; or
the light guide element is a light guide plate fixed on a surface of the circuit board; the light guide plate includes a through hole; the through hole includes the light-emitting element;
the light guide plate is made of a first material which is colorless and light-transmitting; the through hole is filled with a second material which is colorless and light-transmitting; and a refractive index of the first material is less than a refractive index of the second material.

7. The backlight assembly according to claim 5, wherein:
the second light adjustment part includes a beam splitter at a side of the first light adjustment part away from the light guide element; a condenser at a side of the beam splitter away from the first light adjustment part; and a diffuser at a side of the condenser away from the beam splitter; and/or
the first light adjustment part is at the side of the light guide element away from the circuit board.

8. The backlight assembly according to claim 5, wherein:
the light guide element is a light guide plate fixed on a surface of the circuit board; the light guide plate includes a through hole; the through hole includes the light-emitting element; the light guide plate is made of a first material which is colorless and light-transmitting; the through hole is filled with a second material which is colorless and light-transmitting; the second material is mixed with fluorescent powder; a refractive index of the first material is less than a refractive index of the second material; and the first light adjustment part includes the second material and the fluorescent power.

9. The backlight assembly according to claim 1, wherein:
the sidewall of the through hole is covered with a reflective film.

10. A formation method of a backlight assembly, comprising:
forming a light guide plate configured as a light guide element, such that light emitted from one of a plurality of light-emitting elements is transmitted to a display element according to a preset light-guiding path; and
fixing the light guide plate with a circuit board, wherein the plurality of light-emitting elements is at a side of the circuit board; the light guide plate is fixed at the side of the circuit board with the plurality of light-emitting elements; the light guide plate includes a plurality of through holes having a one-to-one correspondence with the plurality of light-emitting elements; the light-emitting element is in a corresponding through hole; and a sidewall of the corresponding through hole at least reflects light emitted from a sidewall of the light-emitting element, such that the reflected light exits through the corresponding through hole.

11. The method according to claim 10, wherein:
the light guide plate is made of a first material which is colorless and light-transmitting; the through hole is filled with a second material which is colorless and light-transmitting; and the second material covers the light-emitting element, wherein a refractive index of the first material is less than the refractive index of the second material.

12. The method according to claim 10, wherein:
the sidewall of the through hole is a curved surface which is bent toward the through hole;
a thickness of the light guide plate is greater than a thickness of the light-emitting element; or
a width of the through hole is greater than a width of the light-emitting element.

13. The method according to claim 11, wherein:
the first material is one of PMMA (poly (methyl methacrylate), PC (polycarbonate), or PBS (polybutylene succinate); and
the second material is one of resin or silica gel.

14. The method according to claim 10, wherein:
a light-emitting element of the plurality of light-emitting elements emits blue light; and a first light adjustment part is disposed at a light-emitting side of the light-emitting element and configured to exit white light based on the blue light emitted from the light-emitting element; and/or
a second light adjustment part is disposed at a side of the light guide element away from the circuit board and configured to adjust a light exit angle and uniformity.

15. The method according to claim 14, wherein:
the first light adjustment part includes a quantum dot film at the side of the light guide element away from the circuit board; or
the first light adjustment part includes a fluorescent layer at the side of the light guide element away from the circuit board; or
the light guide element is a light guide plate fixed on a surface of the circuit board; the light guide plate includes a through hole; the through hole includes the light-emitting element; the light guide plate is made of a first material which is colorless and light-transmitting; the through hole is filled with a second material which is colorless and light-transmitting; and a refractive index of the first material is less than a refractive index of the second material.

16. The method according to claim 14, wherein:
the second light adjustment part includes a beam splitter at a side of the first light adjustment part away from the light guide element; a condenser at a side of the beam splitter away from the first light adjustment part; and a diffuser at a side of the condenser away from the beam splitter; and/or
the first light adjustment part is at the side of the light guide element away from the circuit board.

17. The method according to claim 10, wherein:
the sidewall of the through hole is covered with a reflective film.

18. A display apparatus, comprising:
a backlight assembly, comprising:
a circuit board;
a plurality of light-emitting elements, disposed at a side of the circuit board; and
a light guide element, configured to transmit light emitted from the plurality of light-emitting elements to a display element according to a preset light-guiding path; and
the display apparatus further comprising a display element at a light-emitting side of the backlight assembly, wherein the light guide element including a light guide plate fixed on the side of the circuit board with the plurality of light-emitting elements,
the light guide plate includes a plurality of through holes; and a through hole of the plurality of through holes includes at least one light-emitting element a sidewall of the through hole at least reflects light emitted from a sidewall of a light-emitting element, such that the reflected light exits through an opening of the through hole away from the circuit board.

* * * * *